United States Patent
Tamura

(10) Patent No.: US 9,531,908 B2
(45) Date of Patent: Dec. 27, 2016

(54) IMAGE FORMING APPARATUS THAT DETECTS REMOVAL OF OPTION DEVICES CONFIGURED TO BE ATTACHABLE/DETACHABLE TO/FROM A BODY PORTION OF THE IMAGE FORMING APPARATUS

(71) Applicant: KYOCERA Document Solutions Inc., Osaka-shi, Osaka (JP)

(72) Inventor: Takashi Tamura, Osaka (JP)

(73) Assignee: KYOCERA DOCUMENT SOLUTIONS INC., Osaka-shi, Osaka (JP)

( * ) Notice: Subject to any disclaimer, the term of this patent is extended or adjusted under 35 U.S.C. 154(b) by 0 days.

(21) Appl. No.: 14/849,620

(22) Filed: Sep. 10, 2015

(65) Prior Publication Data

US 2016/0088182 A1  Mar. 24, 2016

(30) Foreign Application Priority Data

Sep. 19, 2014 (JP) .................................. 2014-191504
Sep. 19, 2014 (JP) .................................. 2014-191505

(51) Int. Cl.
*H04N 1/00* (2006.01)
*H04N 1/32* (2006.01)

(52) U.S. Cl.
CPC ...... *H04N 1/32587* (2013.01); *H04N 1/00477* (2013.01); *H04N 2201/0094* (2013.01)

(58) Field of Classification Search
None
See application file for complete search history.

(56) References Cited

U.S. PATENT DOCUMENTS

| 2008/0187346 A1* | 8/2008 | Kato | G03G 15/5075 399/83 |
| 2010/0189459 A1* | 7/2010 | Takase | G03G 15/55 399/82 |

FOREIGN PATENT DOCUMENTS

JP  2007166057 A  6/2007

\* cited by examiner

*Primary Examiner* — Andrew H Lam

(57) ABSTRACT

An image forming apparatus according to one aspect of this disclosure has a sensor unit, a program registration unit, and a judgment unit. The sensor unit detects removal of an option device, which is configured to be attachable/detachable to/from a body portion of the image forming apparatus, with respect to the body portion. The program registration unit receives a setting relating to processing which is executable by the image forming apparatus, and then generates programs which cause the image forming apparatus to execute the processing based on the received setting and also causes a storage unit of the image forming apparatus to store the generated programs. The judgment unit judges, when the sensor unit detects removal of the option devices, whether at least one of the programs to be stored in the storage unit becomes non-executable due to the removal of the option devices.

20 Claims, 11 Drawing Sheets

IMAGE FORMING APPARATUS THAT DETECTS REMOVAL OF OPTION DEVICES CONFIGURED TO BE ATTACHABLE/DETACHABLE TO/FROM A BODY PORTION OF THE IMAGE FORMING APPARATUS

INCORPORATION BY REFERENCE

The disclosure of Japanese Patent Application Nos. 2014-191504 and the disclosure of 2014-191505, both filed on Sep. 19, 2014, including the specifications, drawings and abstracts are incorporated herein by reference in its entirety.

BACKGROUND

The present disclosure relates to an image forming apparatus and more particularly relates to a technique of detecting removal of option devices configured to be attachable/detachable to/from a body portion of the image forming apparatus.

In general, an image forming apparatus is provided with various option devices, such as a post-processing device. The option devices are configured to be attachable/detachable to/from a body portion of the image forming apparatus. A user can obtain an image forming apparatus having desired functions by attaching or detaching the option devices.

SUMMARY

An image forming apparatus according to one aspect of the present disclosure has a sensor unit, a program registration unit, and a judgment unit. The sensor unit detects removal of an option device, which is configured to be attachable/detachable to/from a body portion of the image forming apparatus, with respect to the body portion. The program registration unit receives a setting relating to processing which is executable by the image forming apparatus, and then generates programs which cause the image forming apparatus to execute the processing based on the received setting and also causes a storage unit of the image forming apparatus to store the generated programs. The judgment unit judges, when the sensor unit detects removal of the option device, whether at least one of the programs stored in the storage unit becomes non-executable due to the removal of the option device.

DETAILED DESCRIPTION

Figure 1:
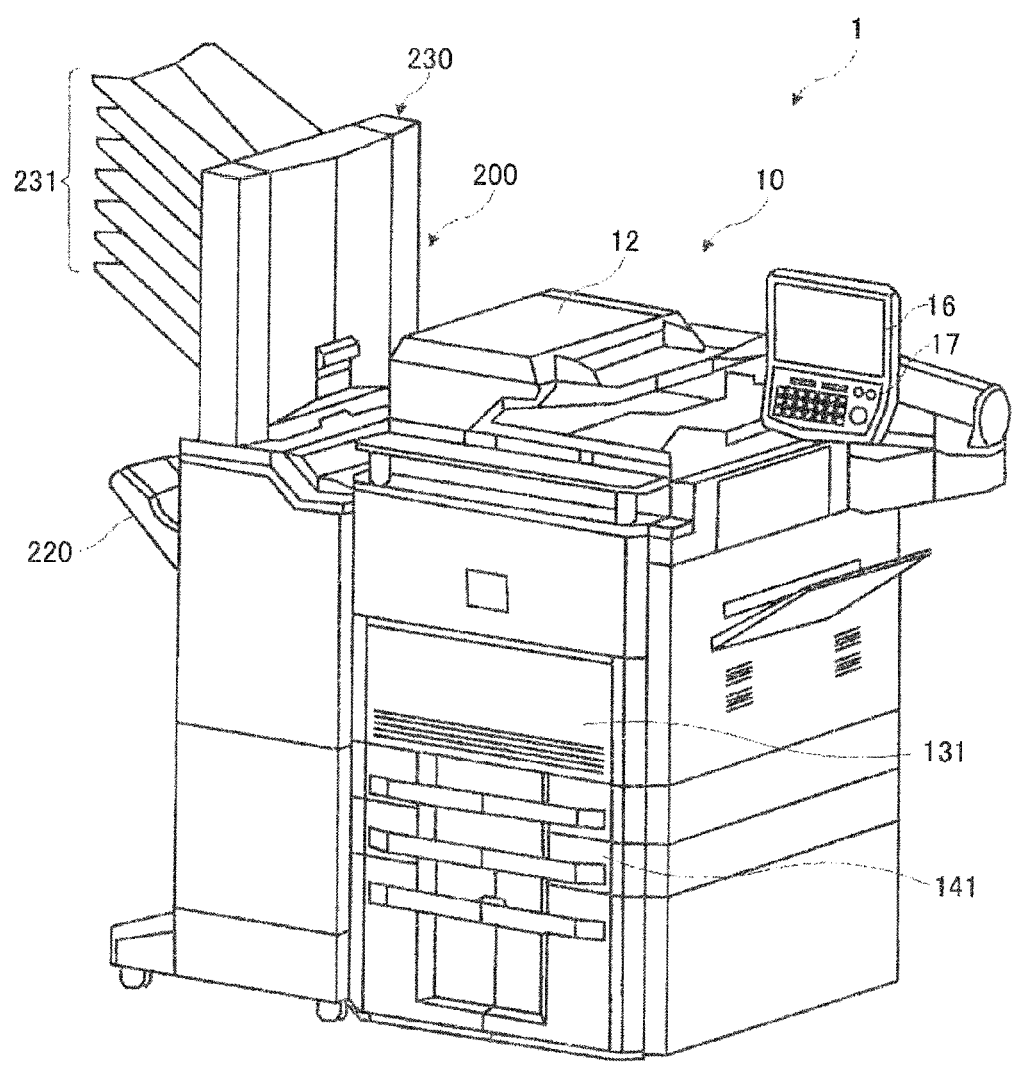
FIG. 1 is a view illustrating the appearance of an image forming apparatus according to one embodiment of the present disclosure.

Hereinafter, an image forming apparatus according to the present disclosure is described with reference to the drawings.

An image forming apparatus 1 is a multifunctional peripheral and has an apparatus body 10 (body portion) and a plurality of option devices configured to be attachable/detachable to/from the apparatus body 10.

When the image forming apparatus 1 performs an image formation operation, an image forming unit 13 forms a toner image on paper to be fed from a paper feed unit 14 based on an image and the like read by an image reading unit 12. Then, the toner image formed on the paper is thermally fixed by a fixing unit (not illustrated).

On the front surface of a casing configuring the outer case of the image forming apparatus 1, a display unit 16 and an operation unit 17 are disposed. The display unit 16 displays a program calling-up screen, a program registration screen, a notification message, a warning screen, and the like described later under the control by a display control unit 102 described later. Moreover, on the front surface of the display unit 16, a touch panel (not illustrated) is disposed.

The operation unit 17 is a hard key having a menu key of calling-up a menu, an arrow key of moving the focus of GUI configuring the menu, a determination key of performing a determination operation to the GUI configuring the menu, and the like, for example.

A communication unit 30 transmits/receives various data to/from a computer 300, a mobile terminal 400, and the like (external terminals) in a local area or on the Internet under the control by a communication control unit 105 described later.

The post-processing device 200 is one of the option devices configured to be attachable/detachable to/from the apparatus body 10. The post-processing device 200 has a punch unit 250 of performing punch processing, a staple unit 260 of performing staple processing, and a book binding unit 270 of performing book binding, and the like and performs post-processing to conveyed paper. Paper subjected to the post-processing is discharged to a main tray 220, mail trays 231 of a mail box 230, and the like.

The sensor unit 20 has a plurality of sensors of detecting removal of the option devices from the apparatus body 10. Herein, the option devices correspond to a toner container (not illustrated) containing toner, a paper feed cassette 141 containing paper, and the like in addition to the post-processing device 200. The toner container can be removed in a state where a front panel 131 of the image forming apparatus 1 is opened.

Figure 2:
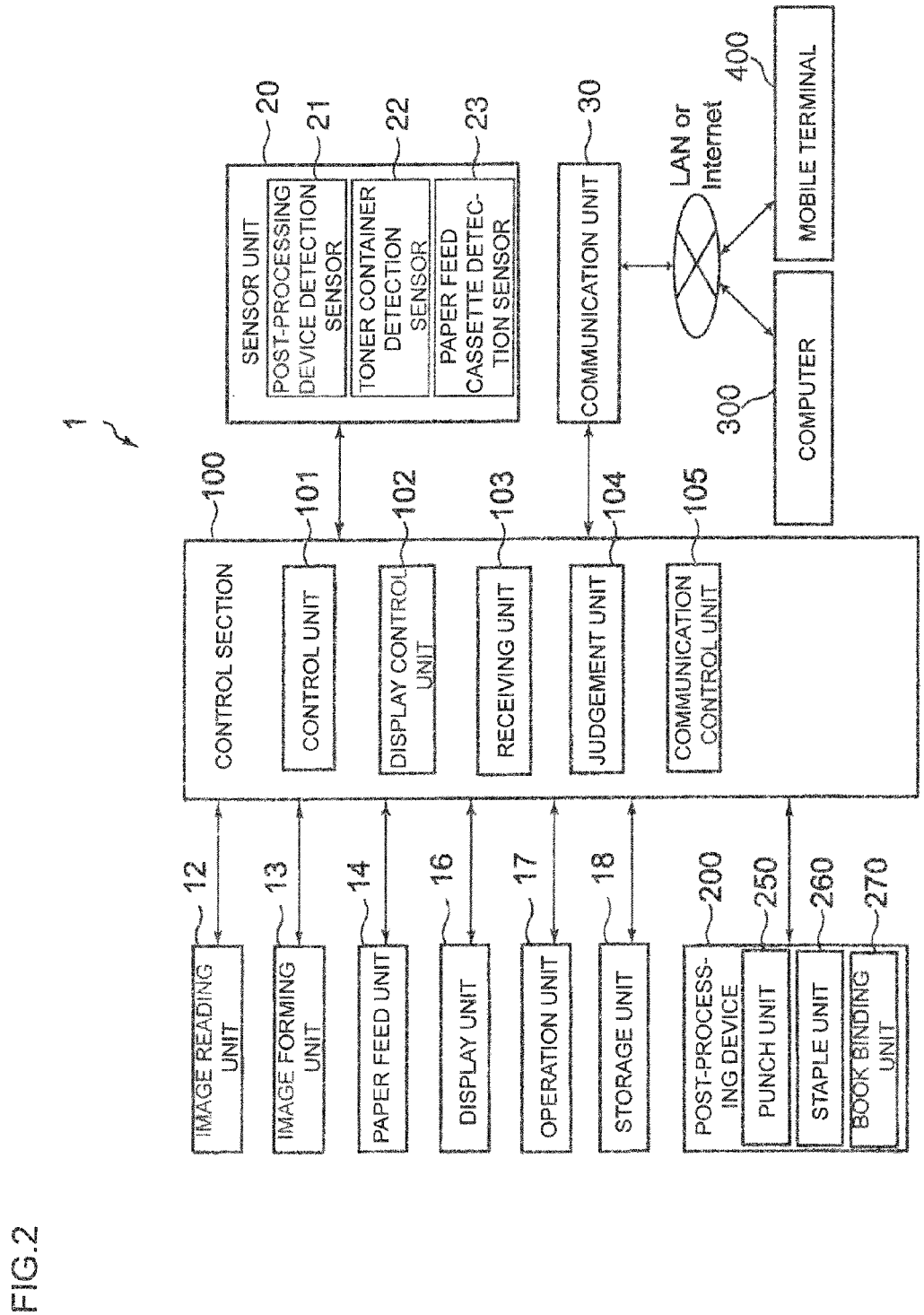
FIG. 2 is a view illustrating the structure of the image forming apparatus according to one embodiment of the present disclosure.

In an example illustrated in FIG. 2, the sensor unit 20 has a post-processing device detection sensor 21 which detects removal of the post-processing device 200, a toner container detection sensor 22 which detects removal of the toner container, and a paper feed cassette detection sensor 23 which detects removal of the paper feed cassette 141.

The image forming apparatus 1 further has a control section 100. Due to the fact that a control program stored in the storage unit 18 is executed, the control section 100 functions as a control unit 101, a display control unit 102, a receiving unit 103, a judgment unit 104, and the communication control unit 105. The control unit 101, the display control unit 102, the receiving unit 103, the judgment unit 104, and the communication control unit 105 of the control section 100 each may be configured from a hard circuit, irrespective of operations based on control programs.

The control unit 101 manages the entire operation control of the image forming apparatus 1. The control unit 101 is connected to the image reading unit 12, the image forming unit 13, the paper feed unit 14, the display unit 16, the operation unit 17, the storage unit 18, the sensor unit 20, the communication unit 30, the post-processing device 200, and the like.

The receiving unit 103 plays a role as a program registration unit which receives a setting relating to processing which is executable by the image forming apparatus 1, and then generates programs which cause the image forming apparatus 1 to execute the processing based on the received setting and also causes the storage unit 18 to store the generated programs.

Figure 3:
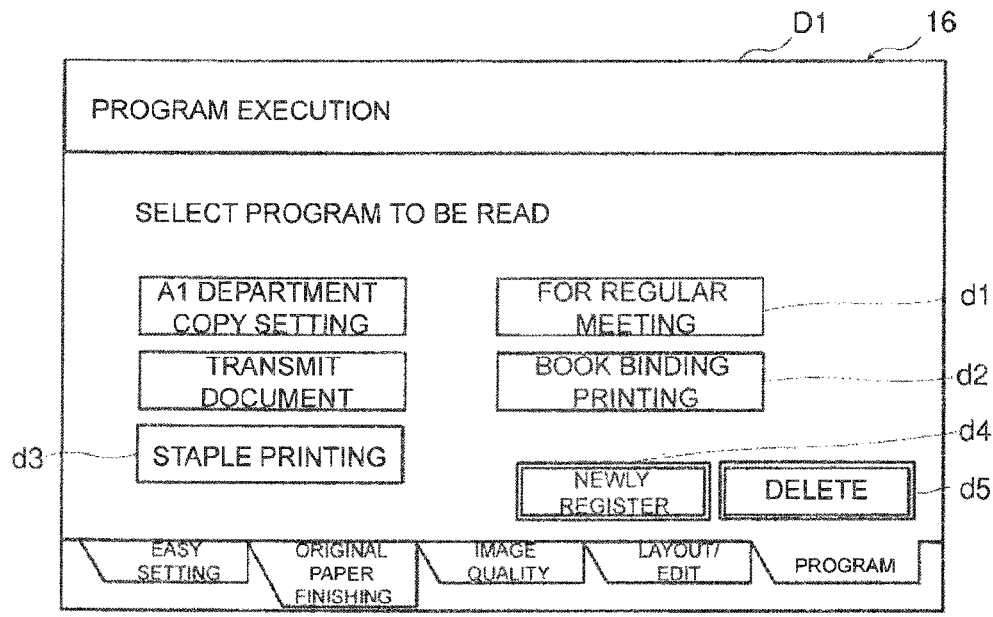
FIG. 3 is a view illustrating an example of a program calling-up screen displayed on a display unit of the image forming apparatus according to one embodiment of the present disclosure.

In an example illustrated in FIG. 3, a program calling-up screen D1 is provided with program calling-up buttons d1, d2, and d3, a program registration button d4, a program deletion button d5, and the like. The program calling-up buttons d1, d2, and d3 each are matched with instructions of executing the programs stored in the storage unit 18. When the receiving unit 103 receives selection of the program calling-up buttons d1, d2, and d3 based on a touch operation to a touch panel provided on the front surface of the display unit 16 and an operation to a hard key provided in the operation unit 17, the control unit 101 executes the programs matched with the selected program calling-up buttons d1, d2, and d3.

Figure 4:
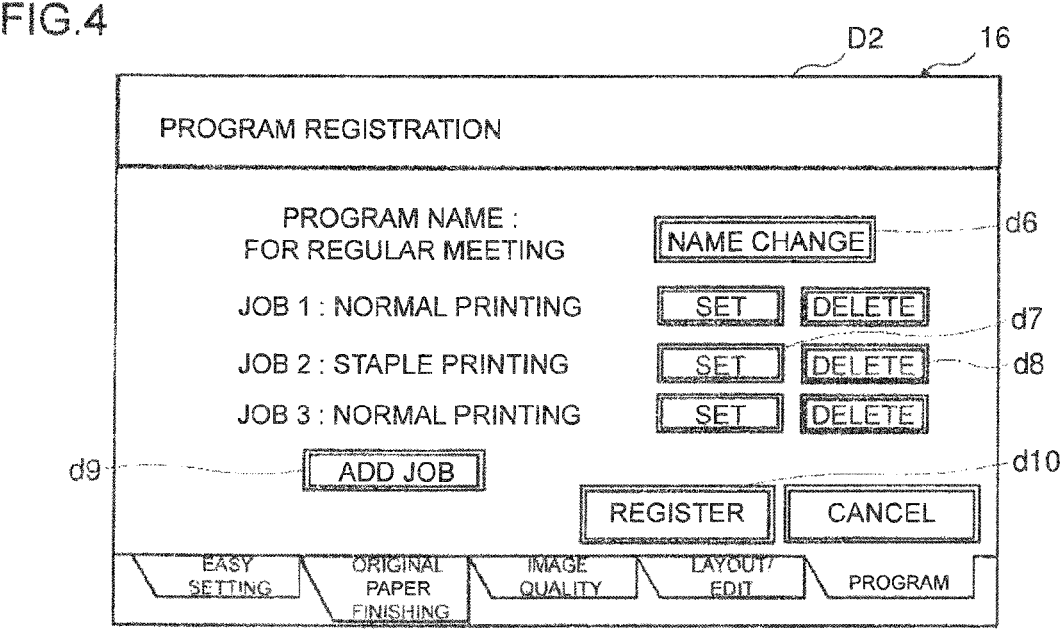
FIG. 4 is a view illustrating an example of a program registration screen displayed on the display unit of the image forming apparatus according to one embodiment of the present disclosure.

When the receiving unit 103 receives selection of a program registration button d4, the display control unit 102 displays a predetermined program registration screen on the display unit 16. FIG. 4 is a view illustrating an example of the program registration screen displayed on the display unit 16. In the example illustrated in FIG. 4, a program name and information indicating a plurality of jobs constituting a program are displayed on a program registration screen D2. Moreover, the program registration screen D2 has a program name change button d6 for receiving a change of the program name, a setting button d7 for receiving a setting to each job configuring a program, a job deletion button d8 for receiving deletion of a job configuring a program, a job addition button d9 for receiving addition of a job configuring a program, a program registration button d10 for receiving registration of a program, and the like.

When receiving the selection of the program registration button d10, the receiving unit 103 generates a program which causes the image forming apparatus 1 to execute processing of a setting received in the program registration screen D2, and then causes the storage unit 18 to store the generated program to thereby register the program.

In the description above, the case where the setting of a program is received in the image forming apparatus 1 is described but the present disclosure is not necessarily limited to the case. A configuration may be acceptable in which a program is generated in the external terminals, such as the computer 300 and the mobile terminal 400, which can communicate with the image forming apparatus 1, and then the generated program is received from the external terminals, whereby the program is registered in the image forming apparatus 1.

The communication control unit 105 has a function of controlling the communication unit 30 to transmit/receive data to/from the computer 300, the mobile terminal 400, and the like.

The judgment unit 104 has a function of judging, when the sensor unit 20 detects removal of the option devices, such as the post-processing device 200, whether at least one of the programs stored in the storage unit 18 and the like becomes non-executable due to the removal of the option devices. Specifically, the judgment unit 104 specifies, with respect to each program stored in the storage unit 18, the configuration of the image forming apparatus 1 which executes processing included in the program. Then, the judgment unit 104 judges that, when the removed option device is contained in the specified configuration of the image forming apparatus 1, at least one of the programs becomes non-executable due to the removal of the option devices. On the other hand, the judgment unit 104 judges that, when the removed option device is not contained in the specified configuration of the image forming apparatus 1, none of the programs becomes non-executable due to the removal of the option devices.

For example, in the case where the sensor unit 20 detects the removal of the post-processing device 200, when a program involving staple processing is contained in the program stored in the storage unit 18, the judgment unit 104 judges that the program becomes non-executable due to the removal of the post-processing device 200. On the other hand, when the registered programs are only programs not involving post-processing, such as staple processing, the judgment unit 104 judges that the programs do not become non-executable due to the removal of the post-processing device 200.

In the case where the sensor unit 20 detects the removal of the paper feed cassette 141, when a program involving image formation processing is contained in the program stored in the storage unit 18, the judgment unit 104 judges that the program becomes non-executable due to the removal of the paper feed cassette 141. This is because, in the state where the paper feed cassette 141 is removed, the paper feed unit 14 cannot feed paper for image formation to the image forming unit 13, so that image formation on paper cannot be achieved. On the other hand, when the programs stored in the storage unit 18 are only programs not involving image formation processing, such as image reading processing, the judgment unit 104 judges that the programs do not become non-executable due to the removal of the paper feed cassette 141.

A warning display performed by the display unit 16 is described.

When the judgment unit 104 judges that at least one of the programs stored in the storage unit 18 and the like becomes non-executable due to the removal of the option devices, the display control unit 102 causes the display unit 16 to display a predetermined warning. Herein, the display unit 16 plays a role as a notification unit of performing predetermined warning notification and the display control unit 102 plays a role as a notification control unit of controlling the notification operation as the notification unit by the display unit 16.

Figure 5:
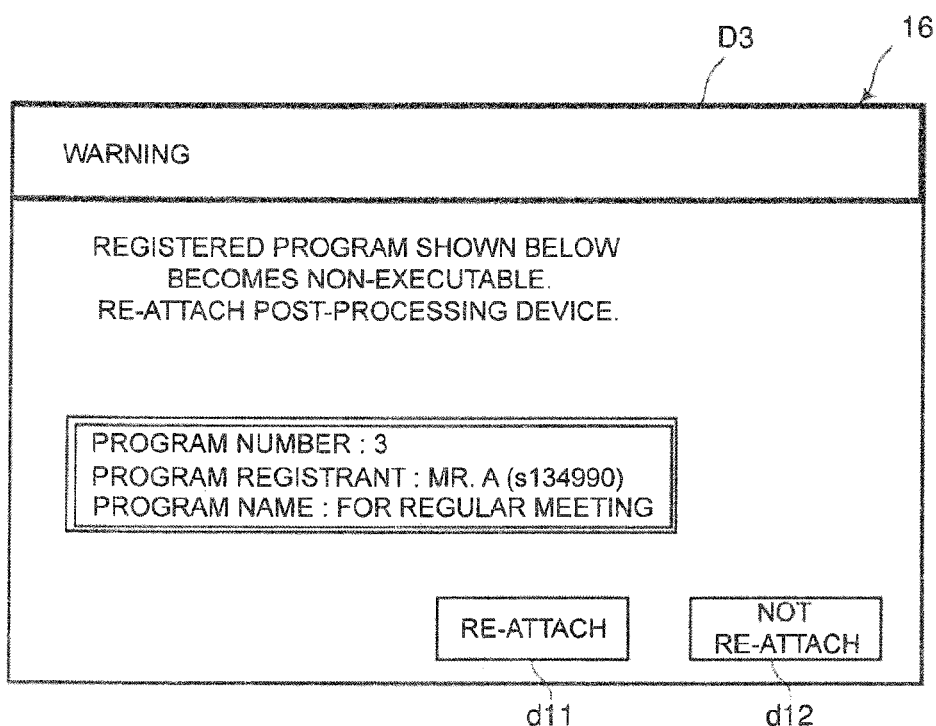
FIG. 5 is a view illustrating an example of a warning screen displayed on the display unit of the image forming apparatus according to one embodiment of the present disclosure.

In an example illustrated in FIG. 5, a warning screen D3 displays information indicating that the registered program becomes non-executable due to the removal of the post-processing device 200 and that the post-processing device 200 needs to be re-attached. Moreover, the warning screen D3 displays the program number of the program which becomes non-executable, a user name who registered the program, the program name, and the like as the information relating to the program which becomes non-executable. By displaying the information on the display unit 16, a user who removed the post-processing device 200 can be notified of the fact that the program which is non-executable in the state where the post-processing device 200 is removed is registered.

When the user re-attaches the option device to the apparatus body 10 in response to the warning display by the display unit 16, the sensor unit 20 detects the re-attachment of the option device, so that the state is returned to a state where the image forming apparatus 1 can execute the registered program. Thus, the user can avoid the situation where the registered program becomes non-executable by re-attaching the option device to the apparatus body 10 in response to the warning display. More specifically, the image forming apparatus 1 is free from the situation where the registered program unintentionally becomes non-executable due to the removal of option devices.

Figure 6:
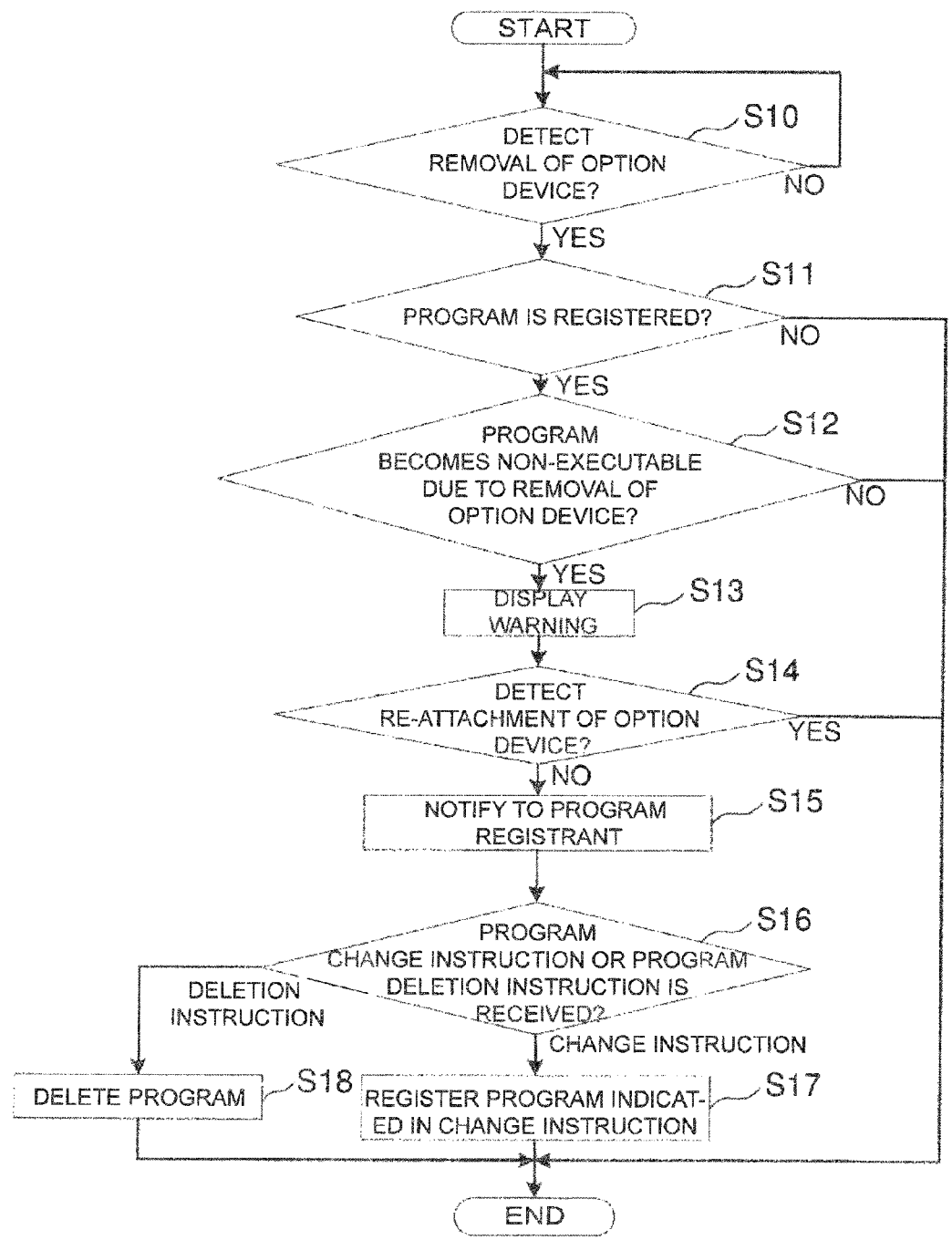
FIG. 6 is a flow chart showing the flow of an operation of the image forming apparatus according to one embodiment of the present disclosure.

Then, the operation of the image forming apparatus 1 having the configuration is described. FIG. 6 is a flow chart showing the flow of the operation of the image forming apparatus 1.

The control unit 101 of the image forming apparatus 1 judges whether or not the sensor unit 20 detects removal of an option device (Step S10).

When the sensor unit 20 detects the removal of an option device (YES in Step S10), the judgment unit 104 accesses to the storage unit 18 to judge whether or not programs are registered (Step S11).

When the programs are registered (NO in Step S11), the judgment unit 104 finishes the processing. On the other hand, when the programs are registered (YES in Step S11), the judgment unit 104 judges whether or not at least one of the programs in the registered programs becomes non-executable due to the removal of an option device (Step S12).

When no programs do not become non-executable (NO in Step S12), the judgment unit 104 finishes the processing. On the other hand, when at least one of the programs becomes non-executable (YES in Step S12), the display control unit 102 causes the display unit 16 to display a predetermined warning (Step S13). The notification operation by the image forming apparatus 1 is not limited to performing the warning display described above. For example, the control unit 101 (notification control unit) may generate a predetermined warning sound from a sound source (notification unit) which is not illustrated in place of the warning display processing in Step S13.

After the warning display by the display unit 16, the control unit 101 judges whether or not the option device is re-attached (Step S14). When the sensor unit 20 detects the re-attachment of the option device, the control unit 101 judges that the option device is re-attached during a period until predetermined time passes after the display unit 16 displays the warning. When the sensor unit 20 does not detect the re-attachment of the option device, the control unit 101 judges that the option device is not re-attached during a period until predetermined time passes after the display unit 16 displays the warning.

The control unit 101 may judge that the option device is re-attached when the receiving unit 103 receives the selection of an instruction button d11 (FIG. 5) for receiving from a user an instruction indicating that the option device is re-attached provided in a warning screen D3. The control unit 101 may judge that the option device is not re-attached when the receiving unit 103 receives the selection of an instruction button d12 (FIG. 5) for receiving from a user an instruction indicating that the option device is not re-attached provided in the warning screen D3.

When the option device is re-attached (YES in Step S14), the control unit 101 finishes the processing. On the other hand, when the option device is not re-attached (NO in Step S14), the communication control unit 105 causes the communication unit 30 to transmit information indicating that the program becomes non-executable (Step S15).

When receiving the registration of a program, the receiving unit 103 receives registrant information on a user who registers the program, and then causes the storage unit 18 to store the received registrant information. The registrant information contains information, such as the IP address and the MAC Address, of external terminals used by the user who registers the program as a notification destination of the user who registers the program. The communication control unit 105 causes the communication unit 30 to transmit the information above to the notification destination indicated in the registrant information stored in the storage unit 18. Thus, the user who registers the program is notified of the fact that the program becomes non-executable.

In the processing in Step S15, the communication control unit 105 causes the communication unit 30 to transmit, in addition to the information indicating that the program becomes non-executable described above, an instruction request of requesting an instruction indicating whether or not the program is deleted and an instruction request of requesting an instruction indicating whether or not the program is changed to the external terminals, such as the computer 300 and the mobile terminal 400.

Figure 7:
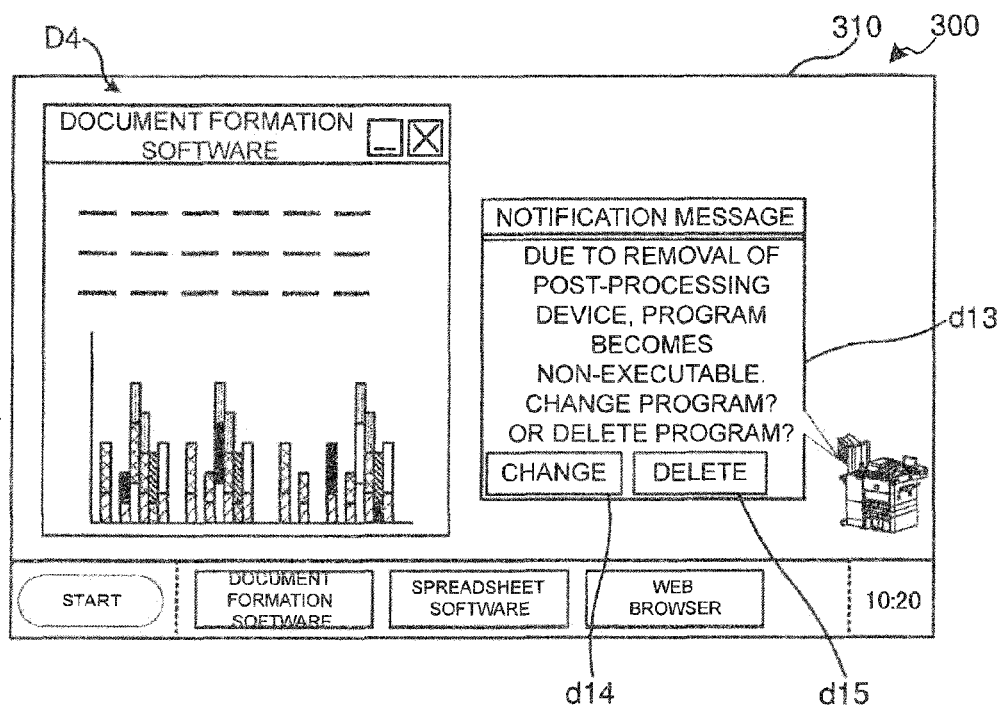
FIG. 7 is a view illustrating an example of a notification message image displayed on a display unit of a computer according to one embodiment of the present disclosure.

The external terminals, such as the computer 300 and the mobile terminal 400, display a predetermined notification message image in response to the information and the instruction request above. FIG. 7 is a view illustrating an example of the notification message image displayed on a display unit 310 of the computer 300. In the example illustrated in FIG. 7, a notification message image D4 displays the fact that the input program becomes non-executable due to the removal of the post-processing device 200 and the information indicating that the changing of the program or the deletion of the program needs to be selected.

When the computer 300 receives the selection of an instruction button d15 for receiving from a user the instruction indicating that the program is deleted provided in the notification message image D4, the computer 300 transmits the instruction (Deletion instruction) indicating that the received program is deleted to the image forming apparatus 1. When the computer 300 receives the selection of an instruction button d14 for receiving from a user the instruction indicating that the program is changed provided in the notification message image D4, the computer 300 transmits the instruction (Change instruction) indicating that the program is changed to the image forming apparatus 1.

After the processing in Step S15, when the program deletion instruction and the program change instruction are transmitted from the external terminals, such as the computer 300 and the mobile terminal 400, the communication control unit 105 causes the communication unit 30 to receive the transmitted deletion instruction and change instruction. Then, when the receiving unit 103 receives the deletion instruction received by the communication unit 30 ("Deletion instruction" in Step S16), the receiving unit 103 causes the storage unit 18 to delete the program which becomes non-executable stored therein.

On the other hand, when the receiving unit 103 receives the program change instruction received by the communication unit 30 ("Change instruction" in Step S16), the receiving unit 103 changes the program which becomes non-executable in the image forming apparatus 1 based on the instruction, and then causes the storage unit 18 to store the program after the change (Step S17).

The reception of the deletion instruction or the change instruction from the registrant of the program as in Step S17 and Step S18 can prevent the program, which becomes non-executable due to the fact that the option device is not re-attached, from being kept registered.

Figure 8:
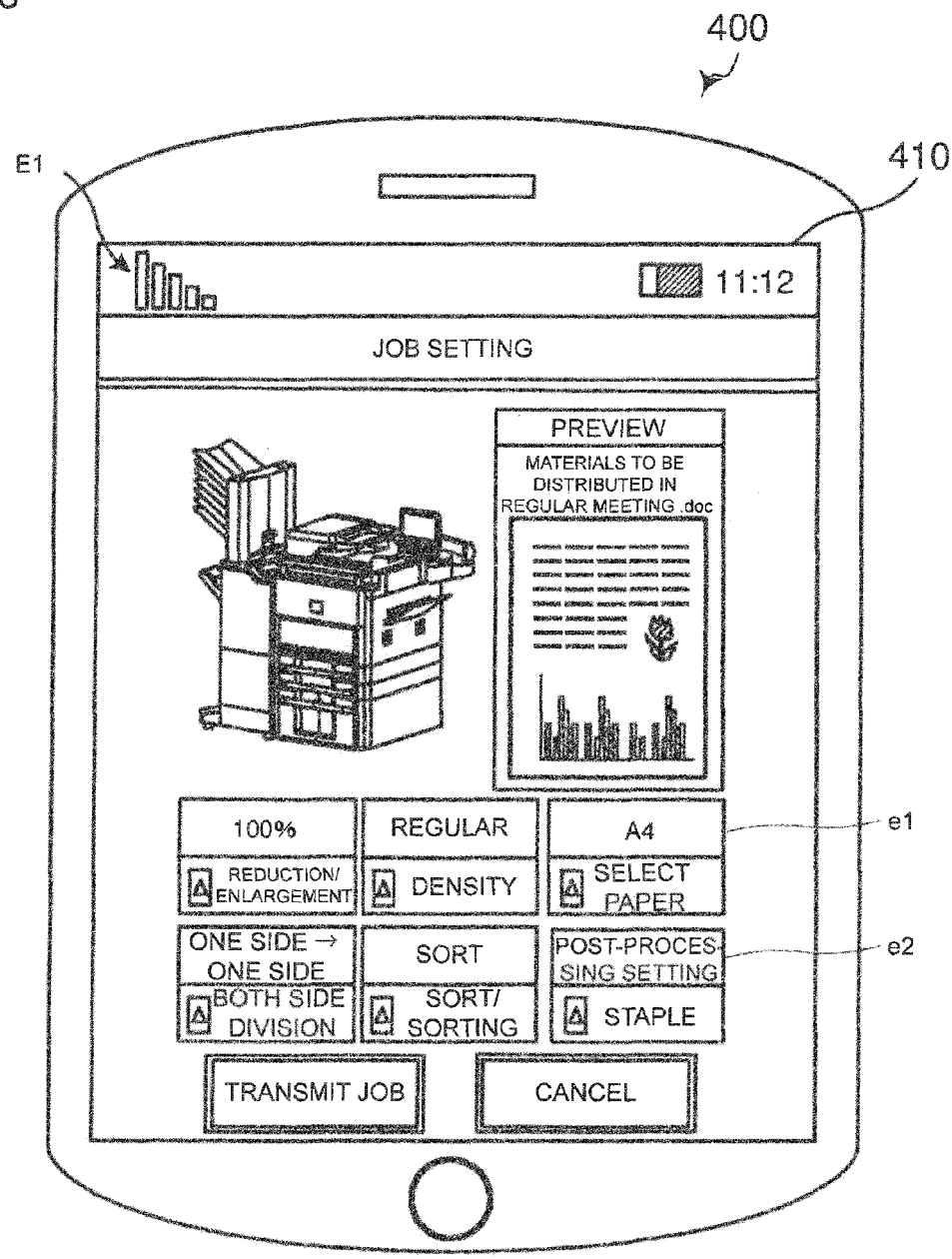
FIG. 8 is a view illustrating an example of a job setting screen displayed on a display unit of a mobile terminal according to another embodiment of the present disclosure.

An image forming apparatus 1 according to another embodiment of the present disclosure may be configured as follows. A receiving unit 103 has a function of receiving jobs relating to processing which is executable by the image forming apparatus 1. The jobs are transmitted from external terminals, such as a computer 300 and a mobile terminal 400, which can communicate with the image forming apparatus 1, and then received by the communication unit 30. FIG. 8 is a view illustrating an example of a job setting screen displayed on a display unit 410 of the mobile terminal 400. In the example illustrated in FIG. 8, a plurality of instruction keys e1 and e2 and the like for inputting settings relating to the jobs are provided in a job setting screen E1. The mobile terminal 400 generates jobs based on a selection operation of the instructions keys e1 and e2 and the like by a user, and then transmits the generated jobs to the image forming apparatus 1.

The job received by the receiving unit 103 is stored in the storage unit 18 and the like as jobs in a held state during a period until the job is executed by an image forming unit 13 and the like. Then, the jobs in the held state are sequentially executed by the image forming unit 13 and the like under the control by the control unit 101.

The receiving unit 103 has a function of receiving the selection of instruction buttons and the like contained in a warning image, a notification message, and the like displayed on the display unit 16 based on a touch operation to a touch panel provided on the front surface of the display unit 16 and an operation to a hard key provided in the operation unit 17.

The communication control unit 105 has a function of controlling the communication unit 30 to transmit/receive data to/from the computer 300, the mobile terminal 400, and the like.

The judgment unit 104 has a function of judging, when the sensor unit 20 detects the removal of an option device, such as a post-processing device 200, whether or not at least one of the jobs in the held state (non-executed jobs) stored in the storage unit 18 and the like becomes non-executable due to the removal of the option device. Specifically, the judgment unit 104 specifies the configuration of the image forming apparatus 1 of executing processing included in the job with respect to each job in the held state. Then, the judgment unit 104 judges that when the removed option device is contained in the specified configuration of the image forming apparatus 1, the job becomes non-executable due to the removal of the option device. On the other hand, the judgment unit 104 judges that, when the removed option device is not contained in the configuration of the specified image forming apparatus 1, the job does not become non-executable due to the removal of the option device.

For example, in the case where the sensor unit 20 detects the removal of the post-processing device 200, when an image formation job involving staple processing is contained in the held job, the judgment unit 104 judges that the job becomes non-executable due to the removal of the post-processing device 200. On the other hand, when the held jobs are only usual image formation jobs not involving post-processing, such as staple processing, the judgment unit 104 judges that the jobs do not become non-executable due to the removal of the post-processing device 200.

In the case where the sensor unit 20 detects the removal of the paper feed cassette 141, when an image formation job is contained in the held job, the judgment unit 104 judges that the job becomes non-executable due to the removal of the paper feed cassette 141. This is because, in the state where the paper feed cassette 141 is removed, the paper feed unit 14 cannot feed paper for image formation to the image forming unit 13, so that image formation on paper cannot be achieved. On the other hand, when the held jobs are only jobs not involving image formation, such as an image reading job, the judgment unit 104 judges that the jobs do not become non-executable due to the removal of the paper feed cassette 141.

The configuration of the image forming apparatus 1 is as described above. Then, the warning display performed by the display unit 16 is described.

When the judgment unit 104 judges that at least one of the jobs in a held state stored in the storage unit 18 and the like becomes non-executable due to the removal of an option device, the display control unit 102 causes the display unit 16 to display a predetermined warning. Herein, the display unit 16 plays a role as a notification unit of performing predetermined warning notification and the display control unit 102 plays a role as a notification control unit of controlling the notification operation as the notification unit by the display unit 16.

Figure 9:
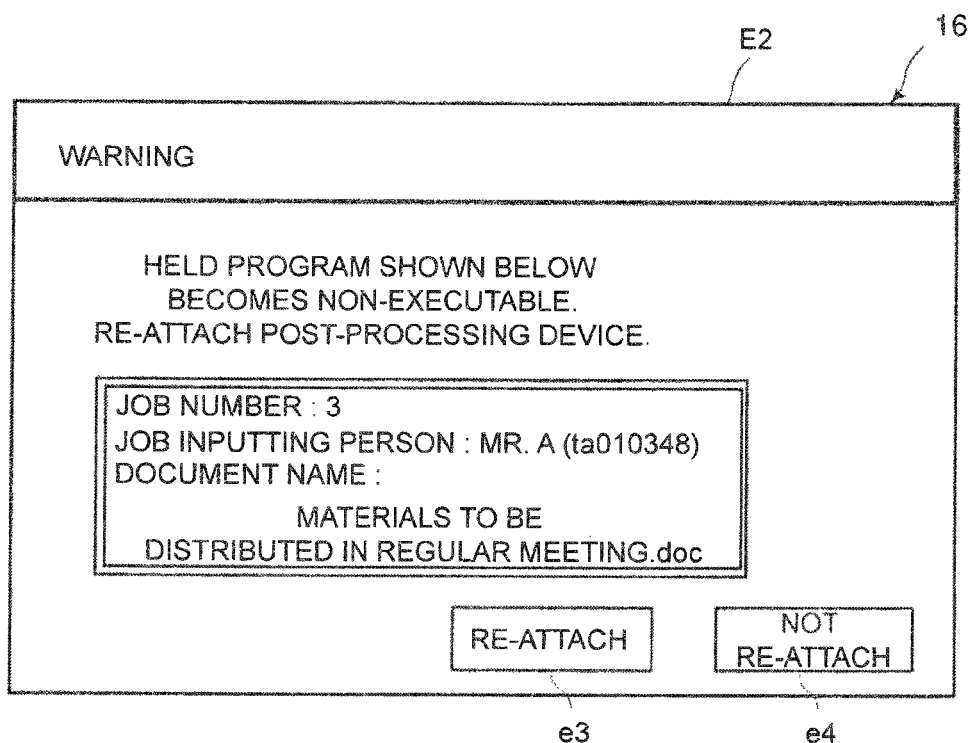
FIG. 9 is a view illustrating an example of a warning image displayed on a display unit of an image forming apparatus according to another embodiment of the present disclosure.

FIG. 9 is a view illustrating an example of a warning image displayed on the display unit 16. In the example illustrated in FIG. 9, a warning image E2 displays information indicating that the held job becomes non-executable due to the removal of the post-processing device 200 and that the post-processing device 200 needs to be re-attached. Moreover, the warning image E2 displays the job number of the job which becomes non-executable, the user name who inputs the job, the document name to be processed by the job, and the like as information relating to the job which becomes non-executable. By displaying the information on the display unit 16, a user who removed the post-processing device 200 can be notified of the fact that a job which is non-executable is held in the state where the post-processing device 200 is removed.

When the user re-attaches the option device to the apparatus body 10 in response to the warning display by the display unit 16, the sensor unit 20 detects the re-attachment of the option device, and then the image forming apparatus 1 returns to the state where the job can be executed. As a result, the held jobs are sequentially executed by the image forming unit 13 and the like under the control by the control unit 101. Thus, by re-attaching the option device to the apparatus body 10 in response to the warning display, the user can avoid the situation where a job in a held state becomes non-executable can be avoided. More specifically, the image forming apparatus 1 is free from the situation where the held jobs unintentionally become non-executable due to the removal of option devices.

Figure 10:
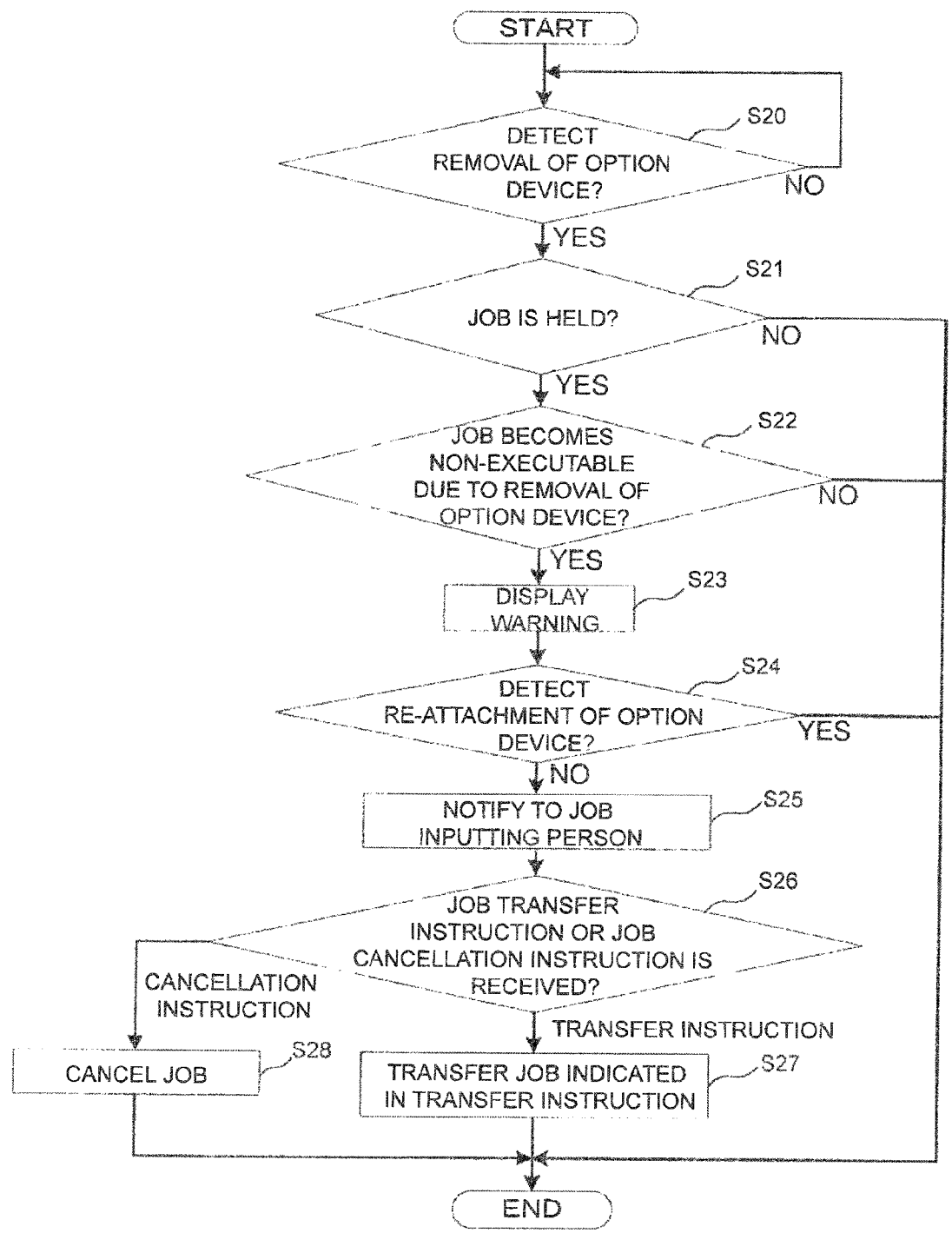
FIG. 10 is a flow chart showing the flow of an operation of the image forming apparatus according to another embodiment of the present disclosure.

Then, the operation of the image forming apparatus 1 having the configuration is described. FIG. 10 is a flow chart showing the flow of the operation of the image forming apparatus 1.

The control unit 101 of the image forming apparatus 1 judges whether or not the sensor unit 20 detects removal of an option device (Step S20).

When the sensor unit 20 detects the removal of an option device (YES in Step S20), the judgment unit 104 accesses to the storage unit 18 to judge whether or not jobs are in a held state (Step S21).

When the jobs are in a held state (NO in Step S21), the judgment unit 104 finishes the processing. On the other hand, when the jobs are in a held state (YES in Step S21), the judgment unit 104 judges whether or not at least one of the jobs in a held state becomes non-executable due to the removal of an option device (Step S12).

When no jobs do not become non-executable (NO in Step S22), the judgment unit 104 finishes the processing. On the other hand, when a job becomes non-executable (YES in Step S22), the display control unit 102 causes the display unit 16 to display a predetermined warning (Step S23). The notification operation by the image forming apparatus 1 is not limited to performing the warning display described above. For example, the control unit 101 (notification control unit) may generate a predetermined warning sound from a sound source (notification unit) which is not illustrated in place of the warning display processing in Step S23.

After the warning display by the display unit 16, the control unit 101 judges whether or not the option device is re-attached (Step S24). When the sensor unit 20 detects the re-attachment of the option device, the control unit 101 judges that the option device is re-attached during a period until predetermined time passes after the display unit 16 displays the warning. When the sensor unit 20 does not detect the re-attachment of the option device, the control unit 101 judges that the option device is not re-attached during a period until predetermined time passes after the display unit 16 displays the warning.

The control unit 101 may judge that the option device is re-attached when the receiving unit 103 receives the selection of an instruction button e3 (FIG. 9) for receiving from a user an instruction indicating that the option device is re-attached provided in a warning screen E2. The control unit 101 may judge that the option device is not re-attached when the receiving unit 103 receives the selection of an instruction button e4 (FIG. 9) for receiving from a user an instruction indicating that the option device is not re-attached provided in the warning screen E2.

When the option device is re-attached (YES in Step S24), the control unit 101 finishes the processing. On the other hand, when the option device is not re-attached (NO in Step S24), the communication control unit 105 causes the communication unit 30 to transmit information indicating that the job becomes non-executable to the external terminals, such as the computer 300 and the mobile terminal 400, which transmit the job (Step S25). Thus, a user who input the job is notified of the fact that the job becomes non-executable.

In the processing in Step S25, the communication control unit 105 causes the communication unit 30 to transmit, in addition to the information indicating that the job becomes non-executable described above, an instruction request of requesting an instruction indicating that the job is canceled or not and an instruction request of requesting an instruction indicating whether or not the job is transferred to another image forming apparatus to the external terminals, such as the computer 300 and the mobile terminal 400.

Figure 11:
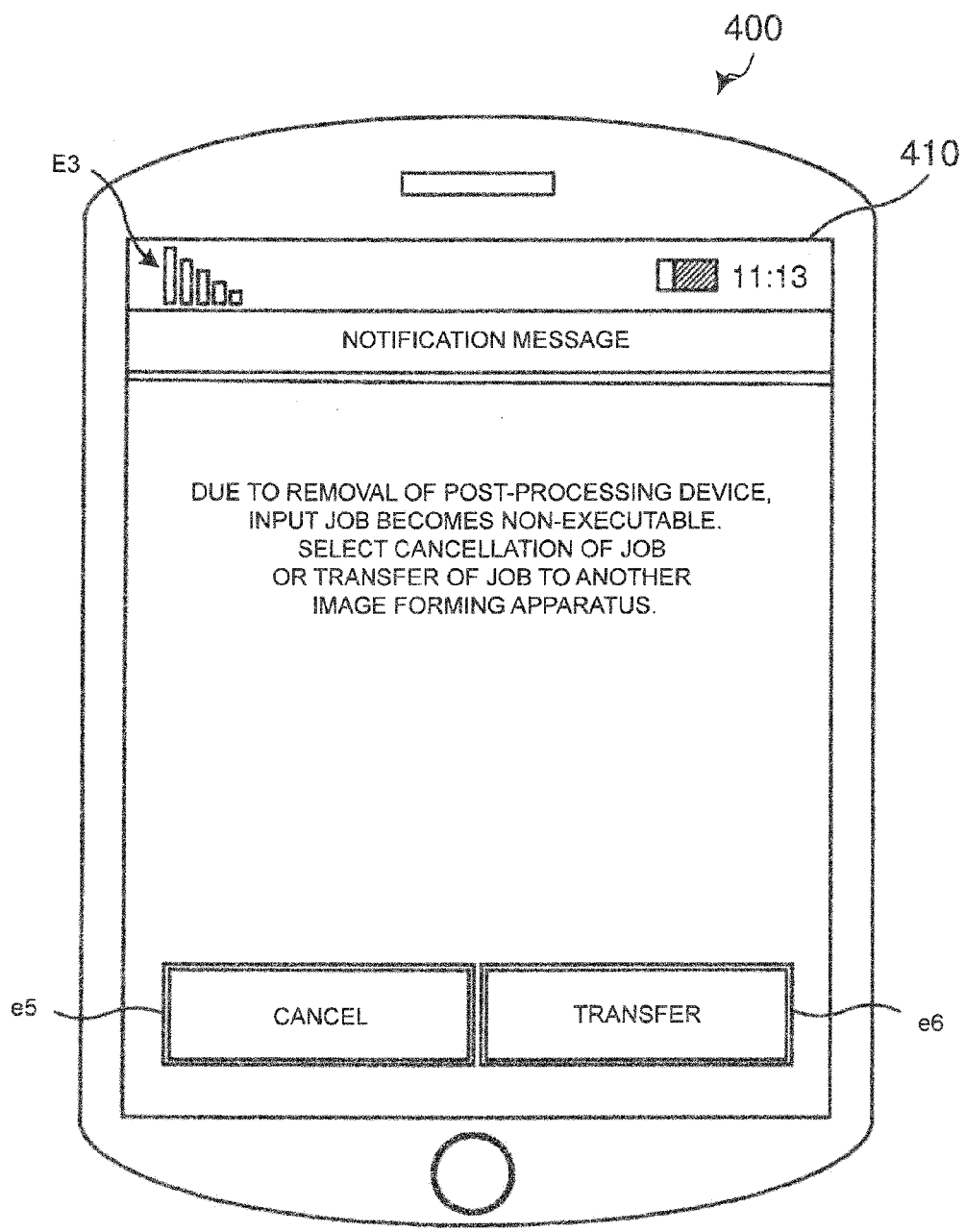
FIG. 11 is a view illustrating an example of a notification message image displayed on a display unit of a mobile terminal according to another embodiment of the present disclosure.

The external terminals, such as the computer 300 and the mobile terminal 400, display a predetermined notification message image in response to the information and the instruction request above. FIG. 11 is a view illustrating an example of the notification message image displayed on the mobile terminal 400. In the example illustrated in FIG. 11, a notification message image E3 displays the fact that the input job becomes non-executable due to the removal of the post-processing device 200 and information indicating that the cancellation of the job or the transfer of the job to another image forming apparatus needs to be selected.

When the mobile terminal 400 receives the selection of an instruction button e5 for receiving from a user the instruction indicating that the job is cancelled provided in the notification message image E3, the mobile terminal 400 transmits the instruction (Cancellation instruction) indicating that the received job is cancelled to the image forming apparatus 1. When the mobile terminal 400 receives selection of an instruction button e6 for receiving from a user the instruction of transferring the job to another image forming apparatus provided in the notification message image E3, the mobile terminal 400 transmits the instruction (Job transfer instruction) indicating that the received job is transferred to another image forming apparatus to the image forming apparatus 1.

After the processing in Step S15, when the cancellation instruction or the transfer instruction of the job is transmitted from the external terminals, such as the computer 300 and the mobile terminal 400, the communication control unit 105 causes the communication unit 30 to receive the cancellation instruction or the transfer instruction which are transmitted. Then, when the receiving unit 103 receives the cancellation instruction received by the communication unit 30 ("Cancellation instruction" in Step S26), the receiving unit 103 deletes the job which becomes non-executable stored in the storage unit 18 to thereby cancel the job (Step S28).

On the other hand, when the receiving unit 103 receives the transfer instruction received by the communication unit 30 ("Transfer instruction" in Step S26), the communication control unit 105 causes the communication unit 30 to transfer the job which becomes non-executable in the image forming apparatus 1 to another image forming apparatus indicated in the transfer instruction (Step S27).

The reception of the cancellation instruction or the transfer instruction from the user who input the job as in Step S27 and Step S28 above can prevent the job, which becomes non-executable due to the fact that the option device is not re-attached, from being kept in the held state.

In an image forming apparatus 1 according to a modification, in the case where a sensor unit 20 detects re-attachment of an option device after warning display by a display unit 16, when the execution of a job is completed, a display control unit 102 may cause the display unit 16 to display information indicating that the execution of the job is completed, and thus the option device can be removed.

Figure 12:
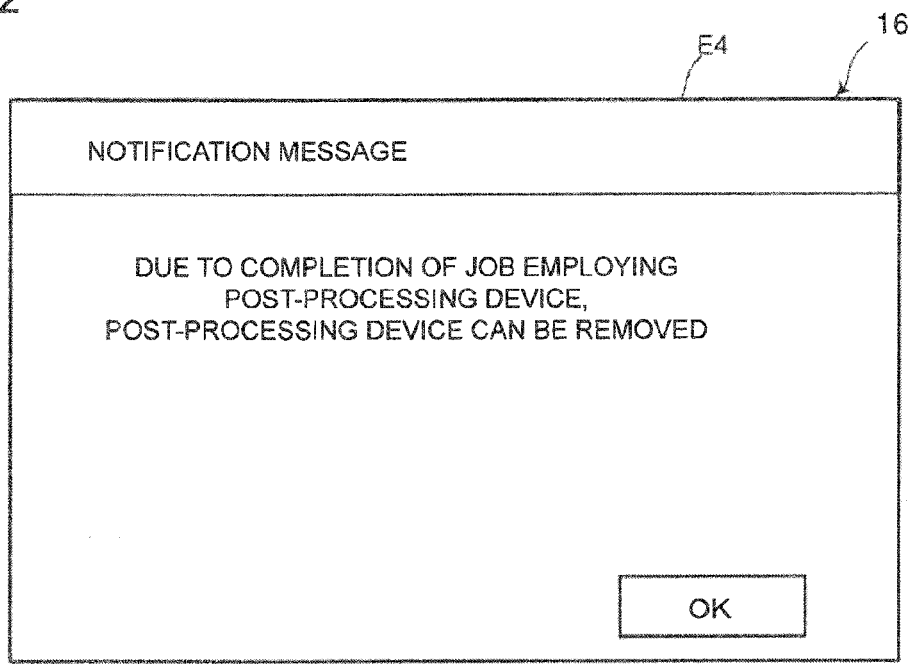
FIG. 12 is a view illustrating an example of a notification message image displayed on a display unit of an image forming apparatus according to a modification.

In an example illustrated in FIG. 12, a notification message image E4 displays information indicating that, since a job employing a post-processing device 200 is completed, the post-processing device 200 can be removed. Thus, when a user re-attaches a post-processing device 200 in response to the display of the warning image E2 illustrated in FIG. 4, the time when the post-processing device 200 can be removed without affecting the job can be notified to the user.

In the embodiments described above, the post-processing device 200, the toner container, and the paper feed cassette 141 are described as examples of the option devices. However, the option devices may be devices configured to be attachable/detachable to/from the apparatus body 10 and are not limited to the configurations described above. For example, a fax unit which performs fax communication and the like correspond to the option devices. When the fax unit is removed from the apparatus body 10 of the image forming apparatus 1, the judgment unit 104 judges whether or not a job involving the fax communication is contained in the held jobs to thereby judge whether or not a job becomes non-executable due to the removal of the fax unit.

The present disclosure is not limited to the configuration of the embodiments described above and can be variously modified.

In the embodiments described, the post-processing device 200, the toner container, and the paper feed cassette 141 are described as examples of the option devices. However, the option devices may be devices configured to be attachable/detachable to/from the apparatus body 10 and are not limited to the configurations described above. For example, a fax unit which performs fax communication and the like correspond to the option devices. When the fax unit is removed from the apparatus body 10 of the image forming apparatus 1, the judgment unit 104 judges whether or not a program involving the fax communication is contained in the registered programs to thereby judge whether or not a program becomes non-executable due to the removal of the fax unit.

What is claimed is:

1. An image forming apparatus comprising:
   a sensor unit which detects removal of an option device, which is configured to be attachable/detachable to/from a body portion of the image forming apparatus, with respect to the body portion;
   a program registration unit which receives a setting relating to processing which is executable by the image forming apparatus, and then generates programs which cause the image forming apparatus to execute the processing based on the received setting and also causes a storage unit of the image forming apparatus to store the generated programs;
   a judgment unit which judges, when the sensor unit detects removal of the option device, whether at least one of the programs stored in the storage unit becomes non-executable due to the removal of the option device;
   a notification unit;
   a notification control unit which controls a notification operation by the notification unit and which causes the notification unit to perform a predetermined warning notification when the judgment unit judges that at least one of the programs becomes non-executable due to the removal of the option device;
   a communication unit; and
   a communication control unit which controls a communication operation by the communication unit, wherein
   the storage unit stores registrant information on a user who registers the program, and
   the communication control unit causes the communication unit to transmit information that the program becomes non-executable to a notification destination indicated in the registrant information when the sensor unit does not detect re-attachment of the option device to the body portion after the warning notification by the notification unit.

2. The image forming apparatus according to claim 1, wherein
   the notification unit includes a display unit, and
   the notification control unit causes the display unit to display a predetermined warning when the judgment unit judges that at least one of the programs becomes non-executable due to the removal of the option device.

3. The image forming apparatus according to claim 2, wherein
   the notification control unit causes the display unit to display information indicating a user who registers the program in the warning display.

4. The image forming apparatus according to claim 1, wherein the communication control unit causes the communication unit to transmit, in addition to the information indicating that the program becomes non-executable, an instruction request of requesting an instruction indicating whether or not the program is deleted to the notification destination and also causes the communication unit to receive the instruction indicating whether or not the program is deleted to be transmitted from the notification destination in response to the instruction request, and
   the program registration unit causes the storage unit to delete the program when the communication unit receives the instruction of deleting the program.

5. The image forming apparatus according to claim 4, wherein
   the notification unit includes a display unit, and
   the notification control unit causes the display unit to display a predetermined warning when the judgment unit judges that at least one of the programs becomes non-executable due to the removal of the option device.

6. The image forming apparatus according to claim 5, wherein
   the notification control unit causes the display unit to display information indicating a user who registers the program in the warning display.

7. The image forming apparatus according to claim 1, wherein
   the communication control unit causes the communication unit to transmit, in addition to the information indicating that the program becomes non-executable, an instruction request of requesting an instruction indicating whether or not the program is changed to the notification destination and also causes the communication unit to receive the instruction indicating whether or not the program is changed to be transmitted from the notification destination in response to the instruction request, and
   the program registration unit changes the program based on the instruction when the communication unit receives the instruction of changing the program, and then causes the storage unit to store the program after the change.

8. The image forming apparatus according to claim 7, wherein
   the notification unit includes a display unit, and the notification control unit causes the display unit to display a predetermined warning when the judgment unit judges that at least one of the programs becomes non-executable due to the removal of the option device.

9. The image forming apparatus according to claim 8, wherein the notification control unit causes the display unit to display information indicating a user who registers the program in the warning display.

10. An image forming apparatus comprising:
a sensor unit which detects removal of an option device, which is configured to be attachable/detachable to/from a body portion of the image forming apparatus, with respect to the body portion,
a receiving unit which receives jobs relating to processing which is executable by the image forming apparatus;
a judgment unit which judges, when the sensor unit detects the removal of the option device, whether or not at least one of the jobs, which are non-executed, becomes non-executable due to the removal of the option device;
a notification unit; and
a notification control unit which controls a notification operation by the notification unit and which causes the notification unit to perform a predetermined warning notification when the judgment unit judges that at least one of the jobs becomes non-executable due to the removal of the option device, wherein
the notification unit includes a display unit, the notification control unit causes the display unit to display a predetermined warning when the judgment unit judges that at least one of the jobs becomes non-executable due to the removal of the option device, and the notification control unit causes the display unit to display information indicating a user who registers the job in the warning display.

11. The image forming apparatus according to claim 10, wherein in a case where the sensor unit detects re-attachment of the option device to the body portion after the warning notification by the notification unit, the notification control unit causes, when execution of the job is completed, the display unit to display information indicating that the execution of the job is completed, and the option device can be removed.

12. The image forming apparatus according to claim 11 further comprising:
a communication unit; and
a communication control unit which controls a communication operation by the communication unit, wherein
the receiving unit receives a job transmitted from an external terminal which can communicate with the image forming apparatus and received by the communication unit, and
the communication control unit causes the communication unit to transmit information indicating that the job becomes non-executable to the external terminal when the sensor unit does not detect re-attachment of the option device to the body portion after the warning notification by the notification unit.

13. The image forming apparatus according to claim 10, wherein in a case where the sensor unit detects re-attachment of the option device to the body portion after the warning notification by the notification unit, the notification control unit causes, when execution of the job is completed, the display unit to display information indicating that the execution of the job is completed, and the option device can be removed.

14. The image forming apparatus according to claim 13, wherein
the communication control unit causes the communication unit to transmit, in addition to the information indicating that the job becomes non-executable to the external terminal, an instruction request of requesting an instruction indicating whether or not the job is cancelled and also causes the communication unit to receive the instruction indicating whether or not the job is cancelled to be transmitted from the external terminal in response to the instruction request, and
the receiving unit cancels the job when the communication unit receives the instruction of cancelling the job.

15. The image forming apparatus according to claim 14, wherein
the notification unit includes a display unit, and
the notification control unit causes the display unit to display a predetermined warning when the judgment unit judges that at least one of the jobs becomes non-executable due to the removal of the option device.

16. The image forming apparatus according to claim 15, wherein,
in a case where the sensor unit detects re-attachment of the option device to the body portion after the warning notification by the notification unit, the notification control unit causes, when execution of the job is completed, the display unit to display information indicating that the execution of the job is completed, and the option device can be removed.

17. An image forming apparatus comprising:
a sensor unit which detects removal of an option device, which is configured to be attachable/detachable to/from a body portion of the image forming apparatus, with respect to the body portion,
a receiving unit which receives jobs relating to processing which is executable by the image forming apparatus;
a judgment unit which judges, when the sensor unit detects the removal of the option device, whether or not at least one of the jobs, which are non-executed, becomes non-executable due to the removal of the option device;
a notification unit;
a notification control unit which controls a notification operation by the notification unit and which causes the notification unit to perform a predetermined warning notification when the judgment unit judges that at least one of the jobs becomes non-executable due to the removal of the option device;
a communication unit; and
a communication control unit which controls a communication operation by the communication unit, wherein
the receiving unit receives a job transmitted from an external terminal which can communicate with the image forming apparatus and received by the communication unit, and
the communication control unit causes the communication unit to transmit information indicating that the job becomes non-executable to the external terminal when the sensor unit does not detect re-attachment of the option device to the body portion after the warning notification by the notification unit.

18. The image forming apparatus according to claim 17, wherein
the notification unit includes a display unit, and
the notification control unit causes the display unit to display a predetermined warning when the judgment unit judges that at least one of the jobs becomes non-executable due to the removal of the option device.

19. The image forming apparatus according to claim 17, wherein
the communication control unit causes the communication unit to transmit, in addition to the information indicating that the job becomes non-executable, an instruction request of requesting an instruction indicating whether or not the job is transferred to another image forming apparatus to the external terminal and also causes the communication unit to receive the instruction indicating whether or not the job is transferred to another image forming apparatus to be transmitted from the external terminal in response to the instruction request, and
the communication control unit causes the communication unit to transfer the job to another image forming apparatus indicated in the instruction when the communication unit receives the instruction of transmitting the job to another image forming apparatus.

20. The image forming apparatus according to claim 19, wherein
the communication control unit causes the communication unit to transmit, in addition to the information indicating that the job becomes non-executable to the external terminal, an instruction request of requesting an instruction indicating whether or not the job is cancelled and also causes the communication unit to receive the instruction indicating whether or not the job is cancelled to be transmitted from the external terminal in response to the instruction request, and
the receiving unit cancels the job when the communication unit receives the instruction of cancelling the job.

* * * * *